(12) United States Patent
Povey

(10) Patent No.: US 9,516,967 B2
(45) Date of Patent: Dec. 13, 2016

(54) HEATING VESSEL

(71) Applicant: Isis Innovation Limited, Oxford, Oxfordshire (GB)

(72) Inventor: Thomas Povey, Oxford (GB)

(73) Assignee: Oxford University Innovation Limited, Oxford (GB)

( * ) Notice: Subject to any disclaimer, the term of this patent is extended or adjusted under 35 U.S.C. 154(b) by 0 days.

(21) Appl. No.: 14/412,599

(22) PCT Filed: Jul. 5, 2013

(86) PCT No.: PCT/GB2013/051786
§ 371 (c)(1),
(2) Date: Jan. 2, 2015

(87) PCT Pub. No.: WO2014/009701
PCT Pub. Date: Jan. 16, 2014

(65) Prior Publication Data
US 2015/0136791 A1    May 21, 2015

(30) Foreign Application Priority Data

Jul. 10, 2012 (GB) .................................. 1212283.4

(51) Int. Cl.
*A47J 27/00* (2006.01)
*A47J 27/02* (2006.01)
*A47J 36/00* (2006.01)

(52) U.S. Cl.
CPC .............. *A47J 27/002* (2013.01); *A47J 27/02* (2013.01)

(58) Field of Classification Search
CPC .......... A47J 27/00; A47J 27/002; A47J 27/02; A47J 36/00; A47J 37/10

USPC .................................... 220/573.1; 126/390.1
See application file for complete search history.

(56) References Cited

U.S. PATENT DOCUMENTS

| 233,189 | A | * | 10/1880 | Barrows | ..................... 220/573.1 |
| D58,201 | S | | 6/1921 | Sailer | |
| 2,014,931 | A | * | 9/1935 | Genovar | ..................... 126/390.1 |
| 2,172,952 | A | * | 9/1939 | Benesh | ..................... 126/376.1 |
| D204,212 | S | | 3/1966 | Davis | |
| D280,182 | S | | 8/1985 | Tyler | |
| D280,490 | S | | 9/1985 | Tyler | |

(Continued)

FOREIGN PATENT DOCUMENTS

| CH | 220992 A | 5/1942 |
| CH | 678263 A5 | 8/1991 |

(Continued)

OTHER PUBLICATIONS

Author Unknown, "MSR XPD Heat Exchanger," Product Description, http://www.facewest.co.uk/MSR-XPD-Heat-Exchanger.html, Retrieved on Jan. 29, 2015, Facewest Ltd., 4 pages.

(Continued)

*Primary Examiner* — J. Gregory Pickett
*Assistant Examiner* — Niki M Eloshway
(74) *Attorney, Agent, or Firm* — Withrow & Terranova, P.L.L.C.; Vincent K. Gustafson

(57) ABSTRACT

A vessel (1) for heating the contents thereof by means of an external heat source (8) comprises a non-horizontal side wall (2) and a heat transfer structure (6) attached to and in good thermal contact with, or formed integrally on, an outer surface of said side wall.

19 Claims, 6 Drawing Sheets

(56) References Cited

U.S. PATENT DOCUMENTS

| | | | |
|---|---|---|---|
| D336,041 S * | 6/1993 | Zama | D9/429 |
| 5,564,589 A | 10/1996 | Fu et al. | |
| D457,099 S | 5/2002 | Lai | |
| D544,298 S | 6/2007 | Eide et al. | |
| D551,909 S | 10/2007 | Eide et al. | |
| D587,995 S | 3/2009 | Studee | |
| D628,883 S | 12/2010 | Stephens | |
| D637,481 S | 5/2011 | Sellari et al. | |
| D684,460 S | 6/2013 | Hodge et al. | |
| D689,335 S | 9/2013 | Ludeman et al. | |
| 2003/0084669 A1 | 5/2003 | Luo | |
| 2003/0121421 A1 | 7/2003 | Wey | |
| 2003/0136270 A1 | 7/2003 | Joshi et al. | |
| 2007/0193575 A1 * | 8/2007 | Jan | 126/390.1 |
| 2009/0218359 A1 | 9/2009 | Repetti, III | |
| 2010/0084412 A1 | 4/2010 | Huang | |
| 2012/0318810 A1 | 12/2012 | Hodge et al. | |

FOREIGN PATENT DOCUMENTS

| | | | |
|---|---|---|---|
| CN | 201328674 Y | | 10/2009 |
| CN | 202069434 U | | 12/2011 |
| DE | 4315058 A1 | * | 9/1993 |
| FR | 2493125 A1 | | 5/1982 |
| IN | 221872 B | | 9/2008 |
| JP | 2002219056 A | | 8/2002 |
| JP | 2006311909 A | | 11/2006 |
| JP | 2008302192 A | | 12/2008 |
| KR | 20070019526 A | | 2/2007 |
| WO | WO 03077718 A1 | * | 9/2003 |
| WO | 2010-110813 A1 | | 9/2010 |
| WO | 2014009701 A2 | | 1/2014 |

OTHER PUBLICATIONS

International Search Report and Written Opinion for International Patent Application No. PCT/GB2013/051786, mailed May 2, 2014, 10 pages.
Author Unknown, "4—Vintage Copper Aluminum Mini Individual Jello Molds Fruit Tart Tins Pans," Ebay Listing, http://www.ebay.com/itm/4-Vintage-COPPER-Aluminum-Mini-Individual-Jello-MOLDS-FRUIT-TART-TINS-PANS-/141252663695, Retrieved on Apr. 28, 2014, eBay Inc., 2 pages.
Author Unknown, "Jell-O Molds Set of Three Vintage Minis," Ebay Listing, http://www.ebay.com/itm/Jell-O-Molds-Set-Of-Three-Vintage-Minis-/161285120415, Retrieved on Apr. 28, 2014, eBay Inc., 2 pages.
Author Unknown, "Set of 9 Vintage Mini Jello Jelly Aspic Molds Fruit Tins Copper Aluminum," Ebay Listing, http://www.ebay.com/itm/Set-of-9-Vintage-Mini-Jello-Jelly-Aspic-Molds-Fruit-Tins-Copper-Aluminum/191147406675?, Retrieved on Apr. 28, 2014, eBay Inc., 2 pages.
Notice of Allowance for U.S. Appl. No. 29/489,146, mailed Sep. 25, 2015, 7 pages.
Examination Report under Section 18(3) for United Kingdom Patent Application No. GB1422437.2, dated May 27, 2016, 3 pages.

* cited by examiner

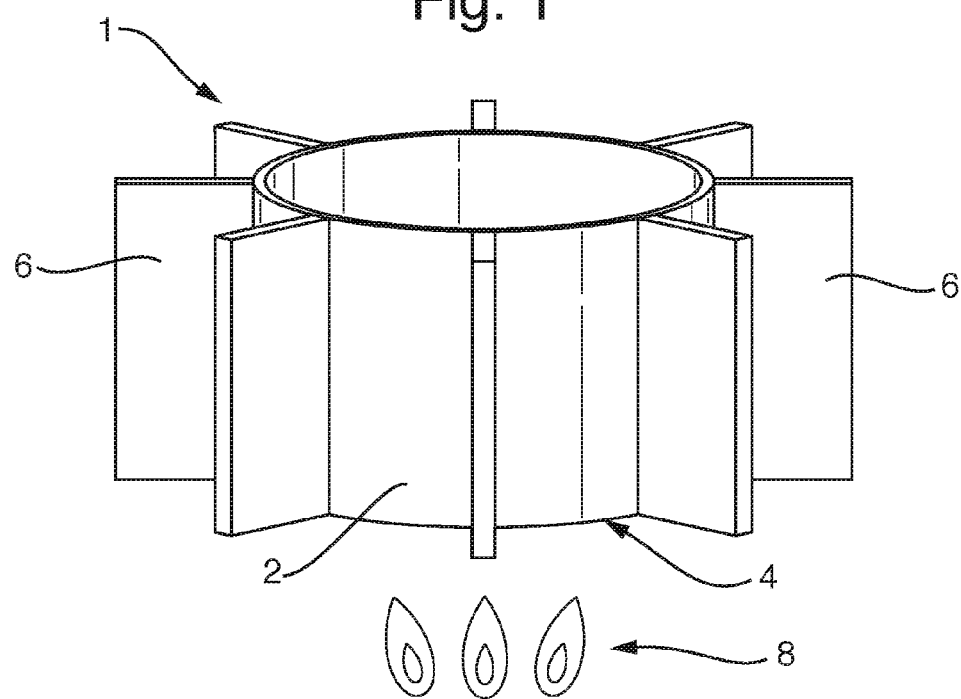
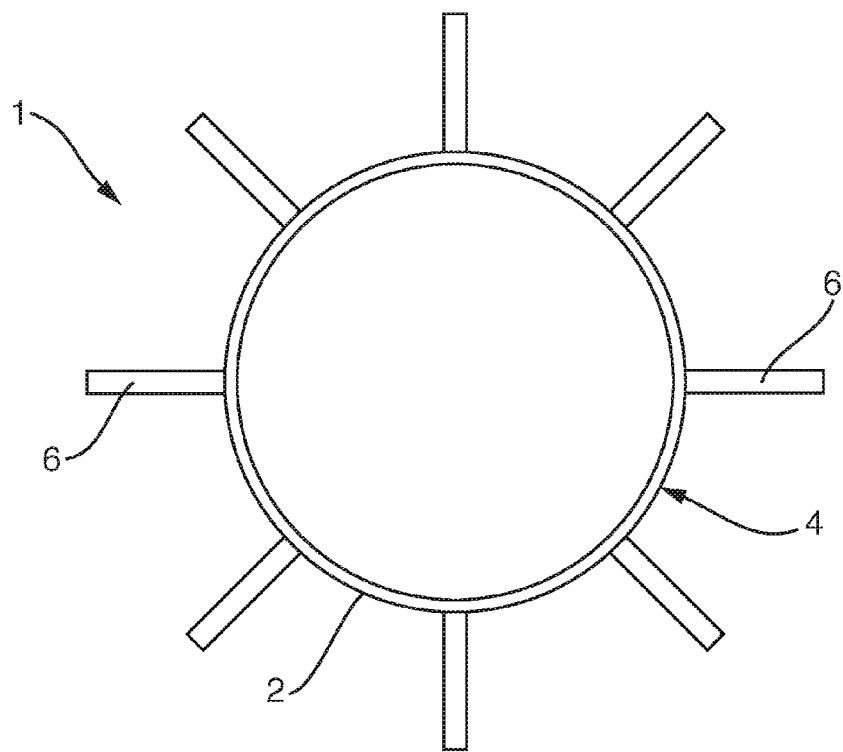

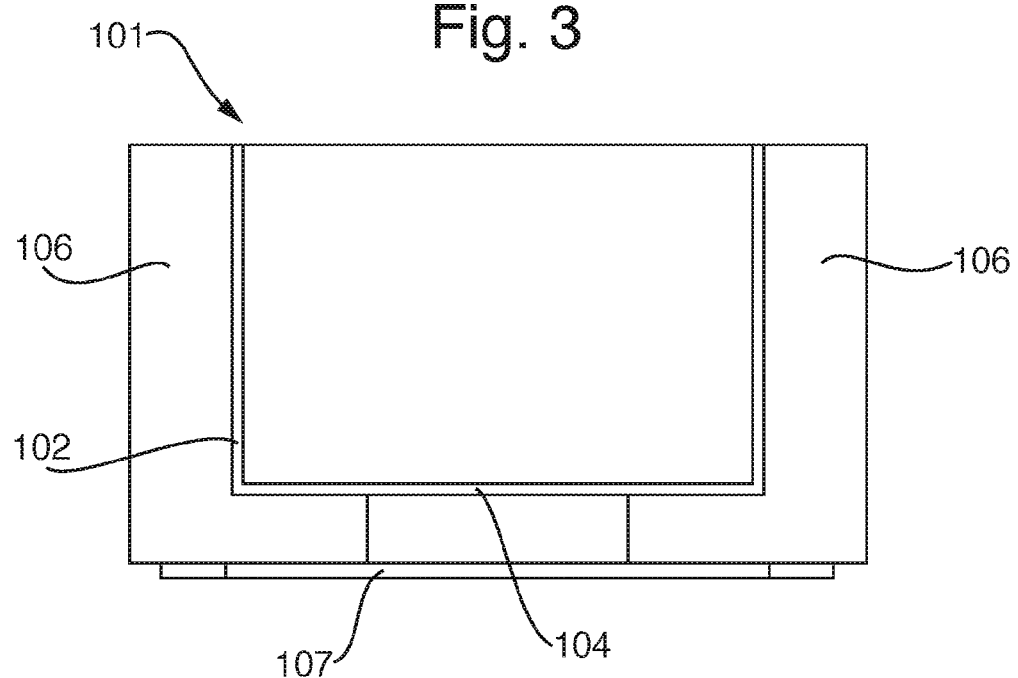
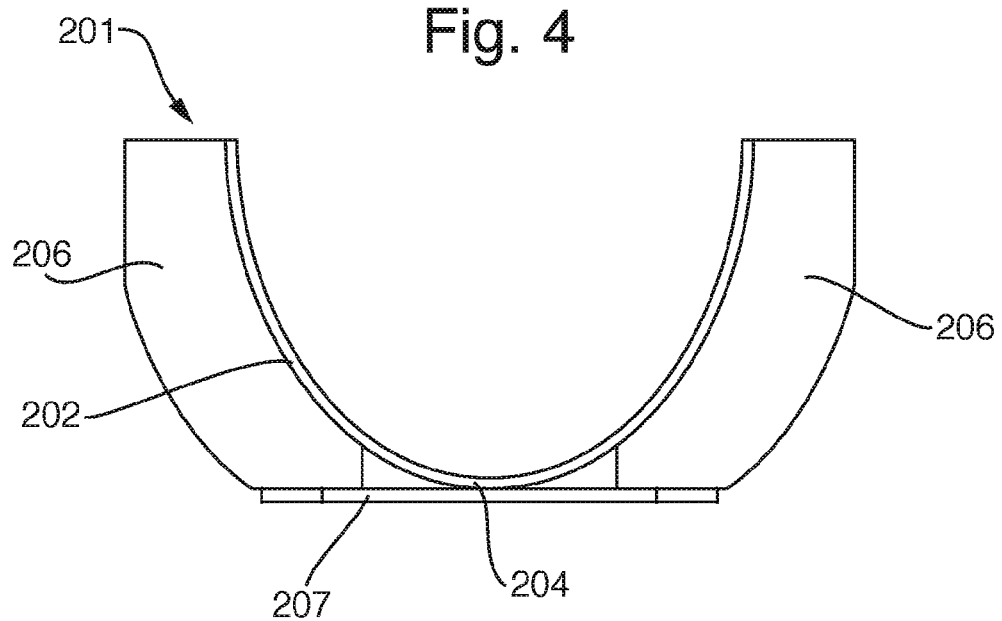

HEATING VESSEL

This application is a 35 U.S.C. §371 national phase filing of International Patent Application No. PCT/GB2013/051786 filed on Jul. 5, 2013, which claims the benefit of United Kingdom Patent Application No. 1212283.4 filed on Jul. 10, 2012. The entire disclosures of the foregoing patent applications are incorporated by reference herein in their respective entireties.

This invention relates to vessels for heating the contents thereof by means of an external heat source, e.g. cooking pans, in particular vessels designed to improve the heat transfer into the vessel, e.g. on gas stoves.

Cooking pans, as used in kitchens around the world, are generally simple vessels whose designs have not changed much over many years. Typically they will have a horizontal base and a typically circular side wall extending upwards from the base to contain a volume within which liquid and foodstuffs can be heated. The Applicant has recognised however that such pans, particularly when used on gas stoves, allow lots of heat energy from the heat source to dissipate into the surrounding atmosphere rather than being captured by the pan to heat its contents. As will be appreciated, this results in the heating of the pan's contents being far from efficient, thus wasting time and energy.

It is an aim of the present invention to provide an improved heating vessel.

The invention provides a vessel for heating the contents thereof by means of an external heat source comprising:
 a non-horizontal side wall; and
 a heat transfer structure attached to and in good thermal contact with, or formed integrally on, an outer surface of said side wall.

Thus it will be appreciated that the invention provides a heat transfer structure in good thermal contact with the side wall of the vessel, so that heated air and/or any flame which travels up the side of the vessel can be captured by the heat transfer structure and the heat conducted into the walls of the vessel and so be used to heat the contents of the vessel. This contrasts with known cooking pans in which the majority of the heat from the gas flame and the heated air passing up by the side of the pan is lost. The increased heat energy available for heating the contents of the vessel thus greatly increases the efficiency of the heating process, i.e. the heating of the vessel's contents is quicker and uses less fuel. Such a design, in certain embodiments, has been found by the Applicant to increase the efficiency with which energy available from a gas flame is transferred into the vessel from 30% to 80%, with the greatest benefit being obtained when the gas flame is largest, because this results in more of the flame and heated air travelling up the side wall of the vessel.

The vessel of the present invention is particularly suitable for placing on a gas stove because of the resultant flame and hot air which pass up the side wall of the vessel during use, the heat from which is captured more effectively by embodiments of the invention. However vessels in accordance with the invention do not need to be used exclusively on gas stoves, they could be used with a number of different heat sources, e.g. a hot plate, an induction heater, an electric ring or a halogen hob, albeit with a smaller enhancement to efficiency compared to a conventional pan.

The vessel could comprise any container which is suitable for heating liquid or food contents, e.g. a cooking pan, frying pan, wok, steamer, pressure cooker, casserole, kettle or a moka maker.

In vessels suitable for receiving and heating liquids and foodstuffs, generally the side wall will be continuous around the vessel and will extend upwardly from a horizontal base. The side wall could be any suitable shape. Commonly it may comprise a circular cylinder shape but equally it could be bowed, tapered, waisted etc. in vertical profile. Similarly the side wall need not be circular in plan profile—it could be faceted—i.e. polygonal in cross section, or even asymmetric.

The vessel may have a discrete horizontal base, however this is not essential. Embodiments are envisaged in which there is no defined transition between the bottom of the vessel and the side wall, e.g. the vessel may be continuously curved as can be found in woks. In such vessels it is desirable that the heat transfer structure is provided on or extends to a part of the side wall outside the region which a typical gas flame plays on directly. Thus in a set of embodiments the heat transfer structure is provided on a portion of the side wall spaced at least 7 cm, or at least 10 cm from the centroid of the underside of the vessel.

The side wall may have the same outer and inner profiles, e.g. if it is made of a relatively thin material of constant thickness. However, particularly if the vessel has a double walled structure, the side wall may have a different inner profile to its outer profile. For example, the vessel could have a flat base and straight sides on the outside to provide better heating and stability, and a more continuously curved interior to facilitate cleaning and stirring of the contents.

The Applicant has found that the present invention delivers a greater benefit with vessels which are tall sided, e.g. pasta pans or coffee makers, than with shallower pans and woks. Therefore in one set of embodiments the height of the vessel is greater than its diameter. If the vessel is non-circular, the diameter is taken to be the greatest dimension of the vessel perpendicular to the height of the vessel when the vessel is placed in its natural operating orientation, i.e. when being used on a heat source.

The heat transfer structure could comprise any suitable member or members or other physical structure which is attached to and in good thermal contact with the side wall of the vessel. To maximise the conduction of heat energy from the heat transfer structure to the side wall of the vessel, the heat transfer structure could be directly and/or permanently attached to the side wall, e.g. brazed, welded or soldered, though the method of attachment may depend on the materials used for the side wall and heat transfer structure. Attachment by mechanical fixings is also envisaged although these would not typically be such that they are intended to allow removal of the structure by a user.

In one set of embodiments the heat transfer structure comprises a plurality of ribs or fins attached to the side wall. The ribs or fins may take any convenient shape. For example they could comprise discrete protrusions. In a set of embodiments they comprise strips. The ribs or fins could, for example, have a cross-section which is rectangular—with the short or long side attached to the vessel side wall—square, semi-circular, triangular, semi-elliptical, L, T or U-shaped etc. Having the ribs or fins tapering in a direction away from the side wall has been found to give a good performance for a given volume of material. The fins or ribs may have a flange or tab for attachment to the side wall.

The ribs or fins could extend horizontally or diagonally but preferably they extend vertically. This still allows heated air and any flame to pass up the side of the vessel and thus encounter a large surface area (comprising the side wall itself and the ribs or fins) to maximise the transfer of heat into the side wall. The ribs or fins could extend part of the way up the side wall, e.g. more than half the way, but preferably the ribs or fins extend along the whole length of the side wall. The ribs or fins could be parallel, divergent or convergent. The cross-section and/or shape thereof could increase, decrease or otherwise change along their length. For example in a set of embodiments the ribs or fins are wider, e.g. in a direction away from the side wall, at the ends (generally the top and bottom of the ribs or fins) than in the middle, as this has been found to capture heat more effectively.

The fins or ribs could be a continuous strip of material, e.g. with a shape that is wider at the ends as discussed above, but in one set of embodiments the fins comprise one or more cut outs. The cut outs could be positioned anywhere along the fins, e.g. in the middle as holes or at the outer edge (away from the side wall), but in one set of embodiments the fins comprise one or more cut outs along the inner edge of the fin, i.e. the side of the fin attached to the side wall of the vessel. The Applicant has appreciated that, particularly in the set of embodiments in which a fin is attached to the side wall, providing cut outs along the inner edge of the fin enables more accurate contact of the fin to be achieved with the side wall of the vessel which aids the operation of attaching the fin to the side wall, e.g. by laser welding. The cut outs could be any suitable shape but, particularly in the embodiments in which the cut out is along the inner edge of the fin, preferably the cut outs extend in a direction generally perpendicular to the side wall of the vessel, i.e. their horizontal width is greater than their vertical height.

The fins, ribs or any other type of discrete heat transfer structure, could be arranged in an irregular pattern around the side wall. However in one set of embodiments the ribs or fins are equally spaced around the side wall, i.e. around the perimeter of the side wall, though there may be a different, e.g. larger, spacing where a handle is provided on the vessel. In one set of embodiments there are at least four, e.g. at least eight, e.g. at least twelve, e.g. at least twenty-four ribs or fins. The heat transfer structure may project from the side wall. The heat transfer structure may project at least 5% of the diameter of the vessel, e.g. at least 10% of the diameter of the vessel, e.g. at least 15% of the diameter of the vessel. This could also be defined absolutely, e.g. the heat transfer structure could project at least 1 cm from the side wall, e.g. at least 2 cm, e.g. at least 3 cm, which will generally be taken to be in the radial direction, i.e. perpendicular to the side wall. In the case of fins or ribs having a width which varies along the length thereof, this is taken to be the maximum width of the fin or rib (defined in a direction perpendicular to the side wall) as in some embodiments the width of the fins or ribs may taper to zero.

The fins or ribs could be separate members attached to the side wall or could be joined—e.g. at one or both ends or part-way along their length. In other embodiments a plurality thereof (e.g. all of them) could be formed integrally—e.g. by a suitably profiled sheet.

In another set of embodiments the heat transfer structure is formed directly on the side wall of the vessel, e.g. by being cast, milled or drilled. The heat transfer structure so formed may have any of the shapes or forms described above in relation to structures attached to the wall. Of course both integral forming and attachment could be used in combination.

The vessel and heat transfer structure will generally be made from materials with a high thermal conductivity, e.g. metal. When not formed integrally, the vessel and heat transfer structure could be made from the same or different materials depending on their suitability for manufacture. Typical materials include aluminium, copper and stainless steels. Stainless steels are easy to weld thus enabling the heat transfer structure to be attached easily to the side wall. The material could be laminated, e.g. aluminium with stainless steel either side. This is advantageous because aluminium has a high thermal conductivity and stainless steels are corrosion resistant, give a good finished appearance and are also easy to clean. The material could be metal plated, e.g. using copper, to give an attractive finish without detracting from the mechanical and/or thermal properties of the vessel. Using such materials the vessel, e.g. a pan, could be made using known techniques. The heat transfer structure could be stamped, water jet or laser cut before being attached to the side wall, e.g. by brazing, welding or soldering.

In one set of embodiments a heat transfer structure is also provided on a base of the vessel. Although the Applicant has found that this does not give as great a benefit as the heat transfer structure provided on the side wall of the vessel, an improvement over the heat transfer into the vessel from a conventional base is noticed. All the features discussed above regarding the heat transfer structure provided on the side wall are applicable to a heat transfer structure on the base of the vessel. The heat transfer structure provided on the base of the vessel could be separate from the heat transfer structure provided on the side wall. However in one set of embodiments the heat transfer structure provided on the side wall extends to the base of the vessel. For example, the ribs or fins could extend from the side walls underneath the vessel onto the base.

For heat transfer structures, e.g. ribs or fins, which are shaped, or for a vessel which is shaped, the outer profile of the vessel does not need to match the outer profile of the heat transfer structure. For example, the side wall of the vessel could be straight and the ribs or fins could be shaped differently as described above, or the side wall of the vessel could be curved and the ribs or fins could have a straight outer edge.

This also extends to the set of embodiments comprising a heat transfer structure provided on the base of the vessel, where preferably the heat transfer structure is arranged to stand flat on a flat surface. For example, if the vessel comprises ribs or fins provided on the base, their bottom edge is preferably flat so they are able to stand stably on a surface or a gas stove. Furthermore, even if the vessel does not comprise a heat transfer structure provided on the base, the heat transfer structure provided on the side wall could project below the level of the base of the vessel. Again, preferably the heat transfer structure is arranged to stand flat on a flat surface. This allows vessels which do not have a flat base to be able to stand stably on a flat surface or stove.

In the sets of embodiments in which a heat transfer structure is provided on the base, extends from the side wall and/or projects from the side wall below the level of the base, the vessel could comprise a mount arranged to stand flat on a flat surface, e.g. attached to the heat transfer structure or the base of the vessel. Thus, even if the heat transfer structure is not arranged to stand flat, the mount provides a base which can stand flat, e.g. for enabling the vessel to be stably placed on a stove or other surface. Typically the mount comprises a continuous flat surface, e.g. a ring, which enables it to stand on the pan support of a gas stove. Such a mount could be removable so that it can be fitted when required and removed after use for cleaning and storage. The removable mount could fit onto the vessel in any number of ways, e.g. directly onto the base of the vessel or onto the heat transfer structure itself, and be spring or clip mounted for easy attachment and removal. Alternatively the mount could be permanently attached to the vessel. Preferably the mount comprises holes to allow the heated air and any flame to flow easily through and around the mount.

Certain preferred embodiments of the invention will now be described, by way of example only, with reference to the accompanying drawings in which:

FIG. 1 shows a schematic diagram of a vessel in accordance with the invention;

FIG. 2 shows a plan view of the vessel shown in FIG. 1;

FIG. 3 shows vertical cross section of a variant of the embodiment shown in FIGS. 1 and 2;

FIG. 4 shows a close up of a variant of the heat transfer structure;

Figure 5:
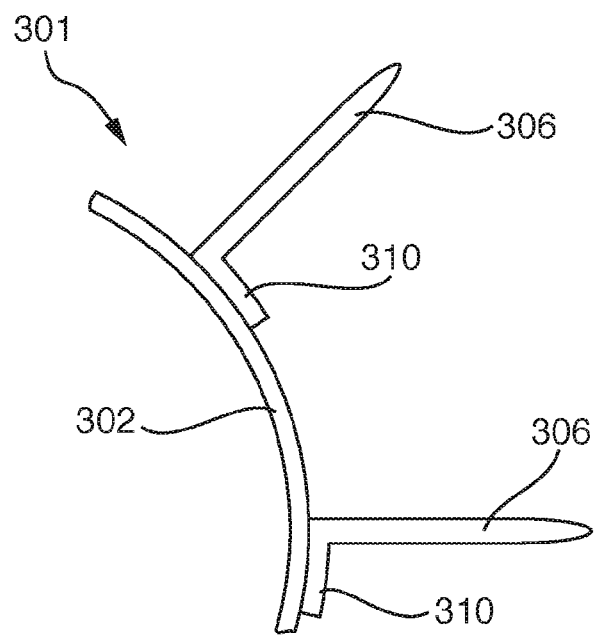
FIG. 5 shows a vertical cross section of a variant of the embodiment shown in FIGS. 1 and 2.

FIGS. 1 and 2 show a vessel 1, e.g. a cooking pan, in accordance with the present invention. The vessel 1 comprises a cylindrical side wall 2 with a circular cross-section that projects perpendicularly from the base 4 of the vessel 1. The main body of the vessel 1, i.e. the side wall 2 and base 4, is made from a material such as aluminium or stainless steel as is conventional. Attached to the outer surface of the side wall 2 is a heat transfer structure comprising a plurality of fins 6. The fins 6 are made from rectangular strips of the same material as the main body of the vessel 1, e.g. aluminium or stainless steel, which are produced by laser cutting a blank sheet of the material, and are laser welded to the side wall 2 to attach them in good thermal contact. Though not shown, a handle could be attached to the vessel 1 to allow it to be carried, particularly when hot.

In operation, a gas flame 8, e.g. from a gas stove, is applied to the base 4 of the vessel 1 to heat contents, e.g. liquid or other foodstuffs, (not shown) contained within the vessel 1. Owing to convection, the air heated by the gas flame 8 passes from underneath the base 4 of the vessel 1 and up along the outer surface of the side wall 2. If the gas flame 8 is particularly large compared to the size of the base 4 of the vessel 1, part of the edges of the gas flame 8 will also protrude from the base 4 and up the side wall 2. For a conventional pan, most of this heat is lost, as only a very small layer of the heated air and/or gas flame 8 is able to conduct heat into the side wall 2 of the vessel. However, for the vessel 1 shown in FIGS. 1 and 2, the fins 6 act to capture this lost heat, owing to the increased surface area and greater penetration into the heated air layer presented by the side wall 2 and fins 6 to the heated air and/or gas flame 8. As the heated air and/or gas flame 8 passes up the side wall 2 of the vessel, the fins 6 are heated. The fins 6 are attached to and in good thermal contact with the side wall 2 of the vessel 1 so this heat is conducted into the side wall 2 where it acts to heat the contents of the vessel 1.

FIG. 3 shows a vertical cross section through a vessel 101 which is a variant of the vessel shown in FIGS. 1 and 2. For this vessel 101 the fins 106, as well as being attached in good thermal contact to the side wall 102 also extend under the base 104 of the vessel 101 where they are also attached in good thermal contact. The operation of the vessel 101 shown in FIG. 3 is the same as the vessel shown in FIGS. 1 and 2, with the portion of the fins 106 attached to the base 104 of the vessel 101 also acting to increase the surface area of the vessel 101 available to be heated, thus increasing the heat energy transferred into the contents of the vessel 101. A mount 107, in the form of a ring, is attached, by welding, to the underside of the portion of the fins 106 extending under the base 104 of the vessel 101, thus enabling the vessel 101 to be stably placed on a stove or flat surface, e.g. a gas stove in which the pan support ring generally has radially aligned prongs.

FIG. 4 shows a vertical cross section through a vessel 201 which is another variant of the vessel shown in FIGS. 1 and 2. The vessel 201 has a curved side wall 202 and base 204, with fins 206 attached to the side wall 202. The fins 206 have a curved portion in the middle to match the profile of the side wall 202, and extend partly to the base 204 of the vessel 201. As in FIG. 3 a mount 207 is attached to the underside of the bottom portion of the fins 206 to enable the vessel 201 to stand on a stove and a flat surface. Operation of the vessel 201 shown in FIG. 4 is the same as has been described above.

FIG. 5 shows a plan view of a segment of a vessel 301 showing an alternative embodiment of the fins 306 attached to the side wall 302. In this embodiment the fins 306 have a tapered distal edge which has been found to increase the heat transfer into the vessel 301. The fins 306 are each attached to the side wall 302 by means of a flange 310, e.g. by welding.

Figure 6:
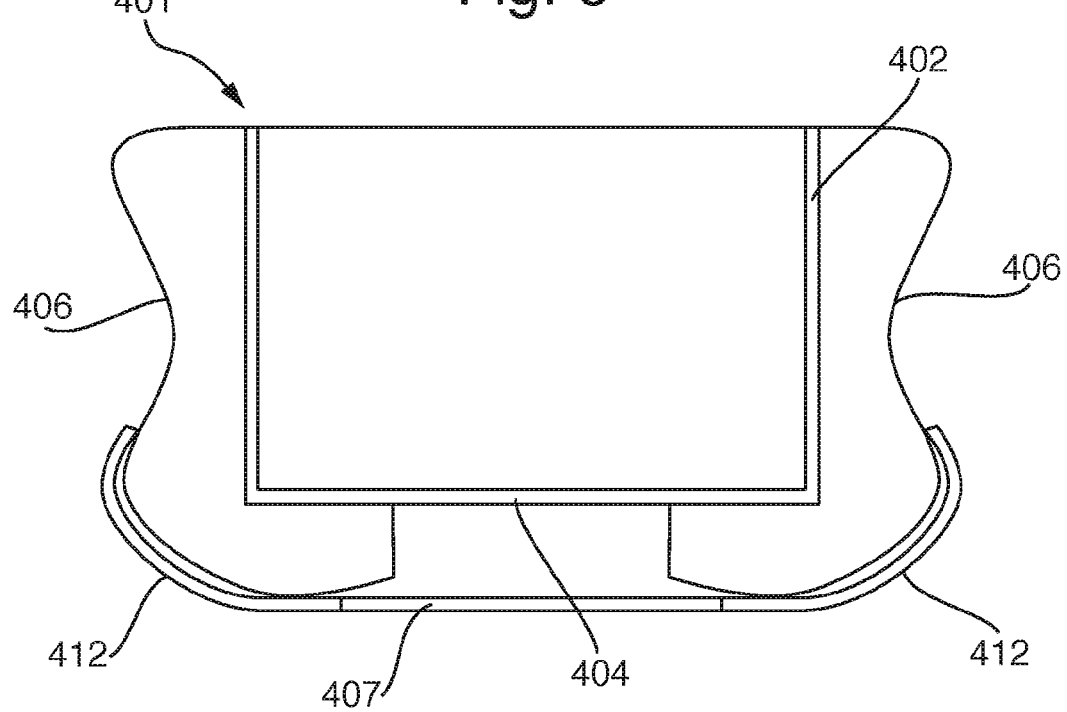
FIG. 6 shows a vertical cross section of a variant of the embodiment shown in FIG. 3.

FIG. 6 shows a vertical cross section through a vessel 401 which is a variant of the vessel shown in FIG. 3. The vessel 401 is cylindrical with a flat base 404, and as in FIG. 3, the fins 406 attached to the side wall 402 extend under the base 404 of the vessel 401. In this embodiment the fins 406 are shaped with a wider upper and lower portion and a waisted middle. This profile of the fins 406 has been found to be more effective in transferring heat into the vessel 401. The top and bottom corners of the fins are curved, i.e. blunt, to protect the user from sharp edges. As the fins 406 extend radially, there is not a continuous bottom to enable the vessel 401 to be placed stably on a gas stove. Therefore a removable mount 412 with a circular base 407 is provided to create a flat bottom for the vessel 401. The removable mount 412 is sprung so that it simply clips on and off over the fins 406.

Figure 7A:
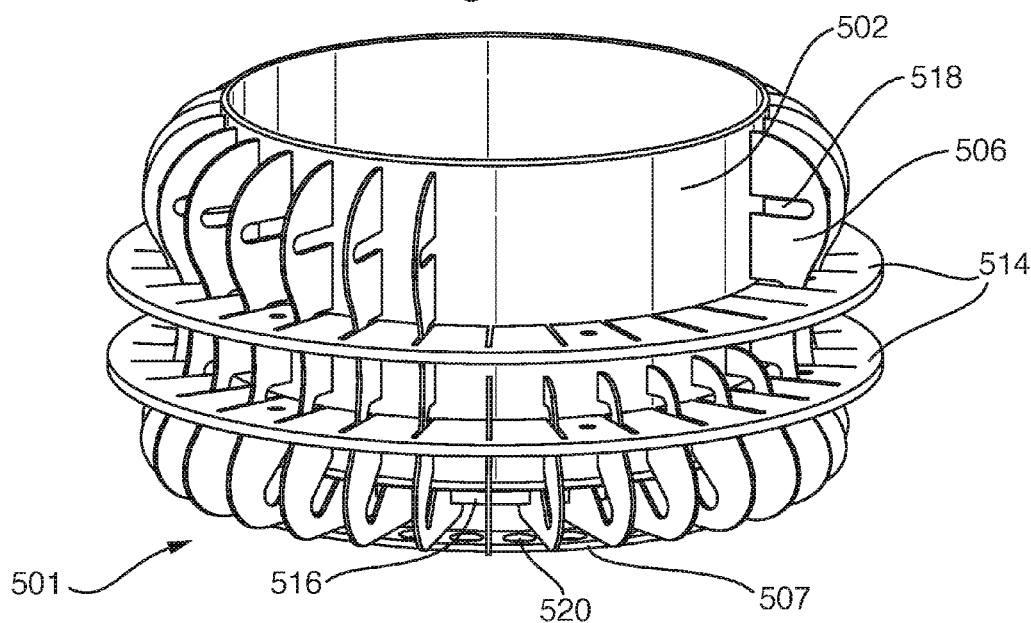
FIGS. 7a and 7b show perspective and underside views respectively of another vessel in accordance with the invention.
Figure 7B:
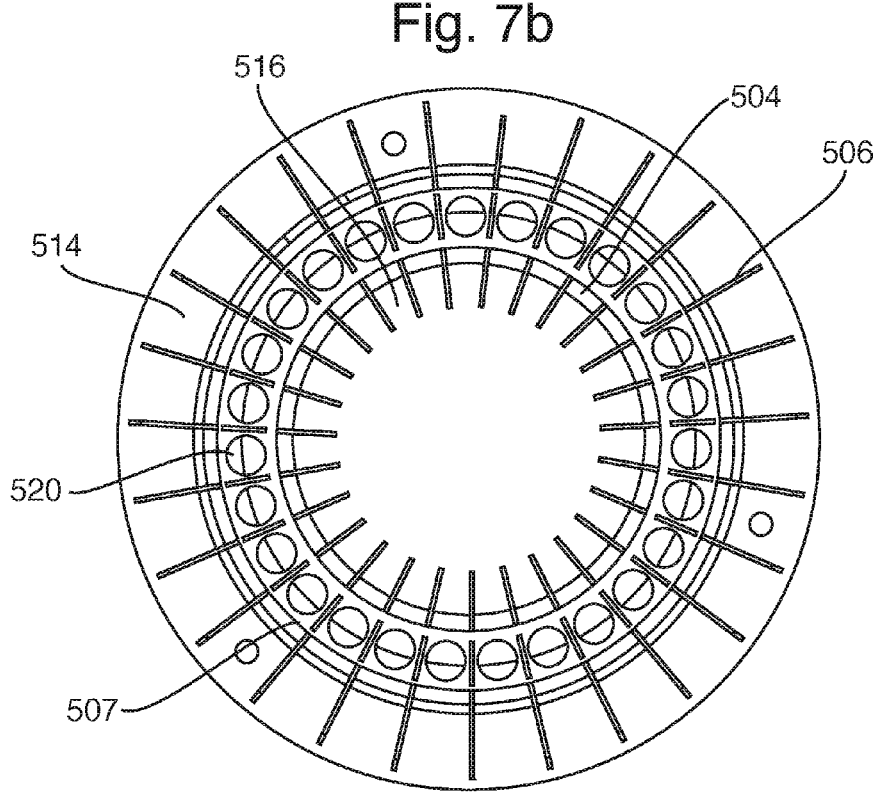

FIGS. 7a and 7b show perspective and underside views respectively of another vessel 501 in accordance with the invention, along with two ring jigs 514 and a star jig 516 to hold the components of the vessel 501 in place during assembly. The vessel 501, similar to some of the vessels shown in the previous drawings is cylindrical with a straight side wall 502 and a flat base 504. As in FIGS. 3 and 6, the fins 506 extend under the base 504 of the vessel 501. Also as in FIG. 6, the fins 506 are shaped with a wider upper and lower portion and a waisted middle. However, in this embodiment the fins 506 comprise cut outs 518 which extend in a direction perpendicular to the side wall 502. These assist the laser welding of the fins 506 to the side wall 502 and base 504 of the vessel 501. An additional feature shown in this embodiment is the provision of a ring mount 507 which is welded to the bottom of the fins 506 in order to provide a continuous flat surface to allow the vessel 501 to be stably placed on a gas stove. The mount 507 comprises a plurality of holes 520 which allow the gas flame, entrained cold air and/or heated air through the mount 507.

Also shown in FIGS. 7a and 7b are two ring jigs 514 and a star jig 516 which each comprise a plurality of slots 522 corresponding to the fins 506. The ring jigs 514 and star jig 516 hold the fins 506 in place during welding and are removed when this has been completed. Operation, during normal use, of the vessel 501 shown in FIGS. 7a and 7b is the same as for the previous embodiments.

Figure 8A:
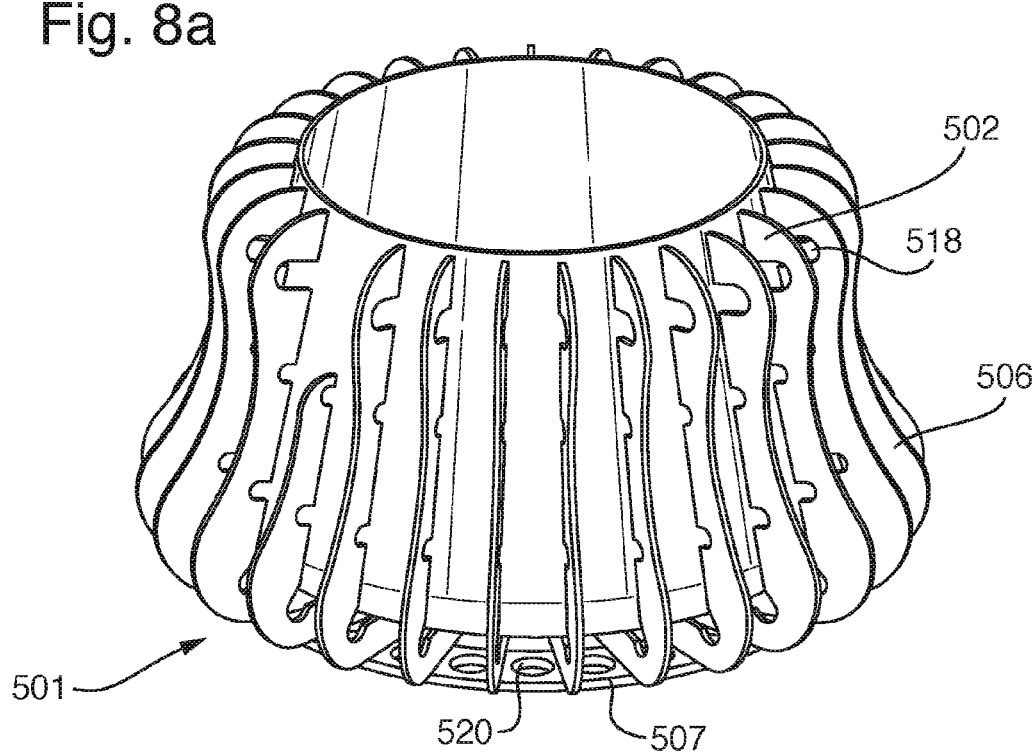
FIGS. 8a and 8b show perspective and underside views respectively of a further vessel in accordance with the invention.
Figure 8B:
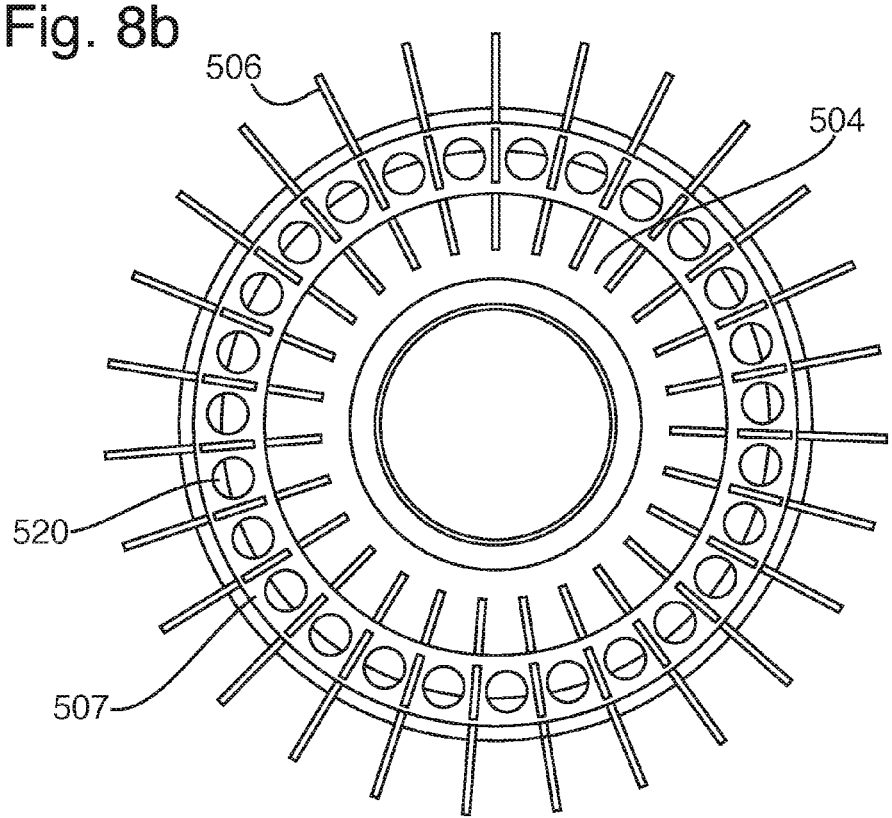

FIGS. 8a and 8b show perspective and underside views respectively of a further vessel 601 in accordance with the invention, similar to the vessel shown in FIGS. 7a and 7b but without the assembly jigs shown. The vessel 601 shown in FIGS. 8a and 8b again has fins 606 attached to the side wall 602 which are shaped with a wider upper and lower portion and a waisted middle, and which extend underneath the base 604 of the vessel 601. As in FIGS. 7a and 7b the fins 606 comprise cut outs 618 which extend in a direction perpendicular to the side wall 602, and have a ring mount 607 attached to the bottom of the fins 606. The vessel 601 shown in FIGS. 8a and 8b is different from the vessel shown in FIGS. 7a and 7b in that it has a tapering side wall 602 such that the opening at the top of the vessel 601 is narrower than the base 604, but in use its operation is the same.

Figure 9:
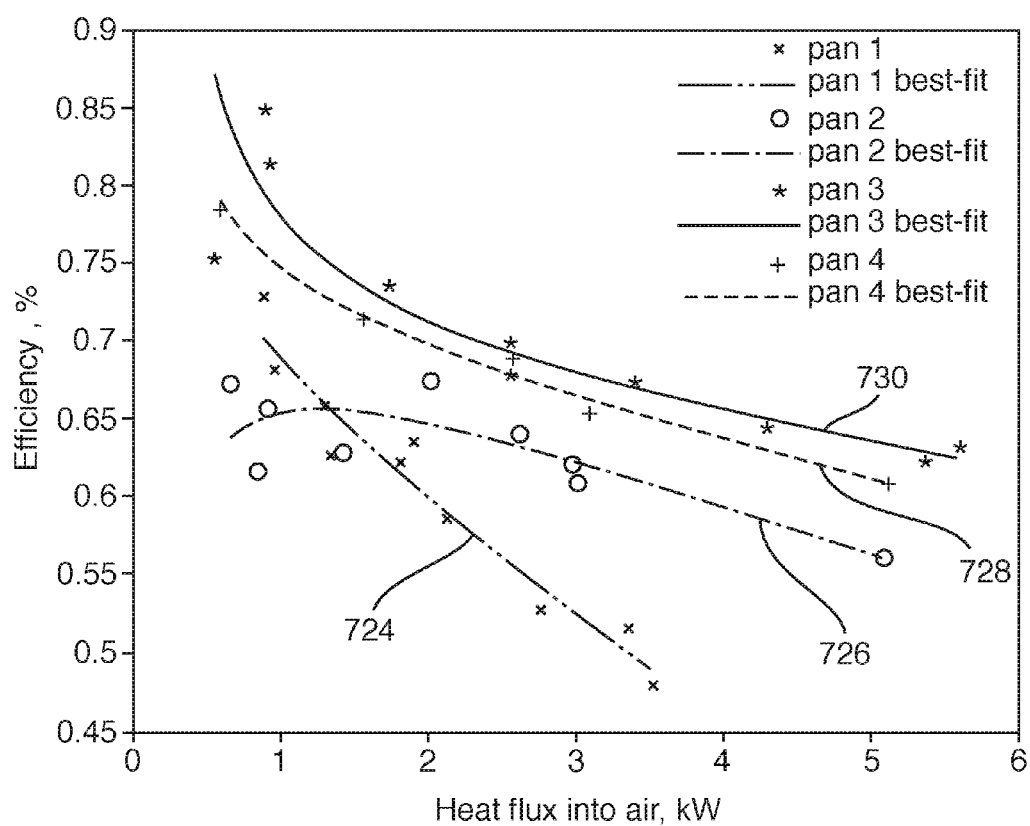
FIG. 9 shows a graph of heat transfer efficiency for vessels in accordance with the invention.

FIG. 9 shows a graph of heat transfer efficiency for vessels in accordance with the invention. The graph plots efficiency against heat flux into the air, for experimental test data taken by the Applicant using a normal gas burner in a purpose built test rig. Pan 1 (724) is a conventional pan without any heat transfer structure attached to the side walls, and Pan 2 (726), Pan 3 (728) and Pan 4 (730) are vessels in accordance with the present invention, i.e. similar to those shown in the embodiments in the drawings. Best fit lines for each of the vessels shown are also plotted through the data points. The graph shows that an improved efficiency, particularly at high heat flux, is obtained for all the vessels in accordance with the present invention. At a heat flux of 4 kW, the (extrapolated) efficiency of Pan 1 (724) is 45%, whereas the other vessels have efficiencies between approximately 60% and 67%, representing an improvement of between 33% and 49% in efficiency. At higher heat flux the improvement is expected to be even greater.

It will be appreciated by those skilled in the art that only a small number of possible embodiments have been described and that many variations and modifications are possible within the scope of the invention. For example the vessel and fins could be any shape and made from any material, and the fins may only extend part way up the sides of the side wall of the vessel. Furthermore, any number of fins could be provided and it is not necessary for them to be equally spaced around the perimeter of the side wall or to be parallel to each other. Heat transfer structures other than fins could be provided. Rather than being attached to a vessel the heat transfer structure could be formed integrally in the side wall of the vessel through casting or machining.

The invention claimed is:

1. A vessel for heating contents thereof by means of an external heat source, the vessel comprising:
   a non-horizontal side wall terminating at a base of the vessel; and
   a heat transfer structure comprising a plurality of ribs or fins attached to and in good thermal contact with, or formed integrally on, an outer surface of said side wall, wherein the plurality of ribs or fins comprise a shape that tapers in a direction away from the side wall;
   wherein each rib or fin of the plurality of ribs or fins extends radially outward from the side wall, and comprises an upper end, a lower end, an upper outermost radial extent proximate to the upper end, a lower outermost radial extent proximate to the lower end, and a reduced outermost radial extent at a position between the upper end and the lower end,
   wherein for each rib or fin of the plurality of ribs or fins, each of the upper outermost radial extent and the lower outermost radial extent is greater than the reduced outermost radial extent; and
   wherein the plurality of ribs or fins extend along the side wall and extend in a continuous manner from the side wall to an underside of at least a portion of the base of the vessel.

2. A vessel as claimed in claim 1, configured for placement on a gas stove.

3. A vessel as claimed in claim 1, wherein the vessel is suitable for heating liquid and/or food contents.

4. A vessel as claimed in claim 1, wherein the base is substantially horizontal, and wherein the side wall is continuous around the vessel and extends upwardly from the base.

5. A vessel as claimed in claim 1, wherein the side wall comprises a circular cylinder shape.

6. A vessel as claimed in claim 1, wherein the plurality of ribs or fins are provided on a portion of the side wall spaced at least 7 cm, or at least 10 cm, from a centroid of the underside of the vessel.

7. A vessel as claimed in claim 1, wherein the plurality of ribs or fins are directly and/or permanently attached to the side wall.

8. A vessel as claimed in claim 1, wherein the plurality of ribs or fins comprise strips.

9. A vessel as claimed in claim 1, wherein the plurality of ribs or fins extend vertically.

10. A vessel as claimed in claim 1, wherein the plurality of ribs or fins extend along an entire length of the side wall.

11. A vessel as claimed in claim 1, wherein the plurality of ribs or fins are equally spaced around the side wall.

12. A vessel as claimed in claim 1, wherein the plurality of ribs or fins comprise at least four ribs or fins.

13. A vessel as claimed in claim 1, wherein the plurality of ribs or fins project from the side wall by at least 5% of a diameter of the vessel.

14. A vessel as claimed in claim 1, wherein the plurality of ribs or fins are formed directly on the side wall of the vessel.

15. A vessel as claimed in claim 1, wherein the plurality of ribs or fins extending in a continuous manner from the side wall to the underside of the at least a portion of the base of the vessel are arranged to permit the vessel to stand flat on a flat surface.

16. A vessel for heating contents thereof by means of an external heat source, the vessel comprising:
   a non-horizontal side wall terminating at a base of the vessel; and
   a plurality of ribs or fins attached to and in good thermal contact with, or formed integrally on, an outer surface of said side wall;
   wherein each rib or fin of the plurality of ribs or fins extends radially outward from the side wall, each rib or fin comprises an upper end and a lower end, and each rib or fin comprises an outermost radial extent proximate to the lower end and an outermost radial extent proximate to the upper end that are each greater than an outermost radial extent at a position between the lower and upper ends; and
   wherein each rib or fin extends along the side wall and extends in a continuous manner from the side wall to an underside of at least a portion of the base of the vessel.

17. A vessel as claimed in claim 16, wherein the plurality of ribs or fins extend vertically along the side wall.

18. A vessel for heating contents thereof by means of an external heat source, the vessel comprising:
  a non-horizontal side wall; and
  a plurality of ribs or fins attached to and in good thermal contact with, or formed integrally on, an outer surface of said side wall;
  wherein each rib or fin of the plurality of ribs or fins extends radially outward from the side wall, each rib or fin comprises an upper end and a lower end, and each rib or fin comprises an outermost radial extent proximate to the lower end and an outermost radial extent proximate to the upper end that are each greater than an outermost radial extent at a position between the lower and upper ends.

19. A vessel as claimed in claim 18, wherein the plurality of ribs or fins extend vertically along said side wall.

* * * * *